United States Patent [19]
Takami

[11] Patent Number: 5,783,820
[45] Date of Patent: Jul. 21, 1998

[54] IMAGE READING APPARATUS HAVING OPTICAL REINFORCING MEMBER FOR LENS HOLDER

[75] Inventor: Eiichi Takami, Chigasaki, Japan

[73] Assignee: Canon Kabushiki Kaisha, Tokyo, Japan

[21] Appl. No.: 947,330

[22] Filed: Oct. 8, 1997

Related U.S. Application Data

[63] Continuation of Ser. No. 635,195, Apr. 19, 1996, abandoned.

[30] Foreign Application Priority Data

Apr. 21, 1995 [JP] Japan ................................. 7-096813

[51] Int. Cl.$^6$ ........................................... H04N 1/28
[52] U.S. Cl. ...................... 250/239; 250/208.1; 257/433
[58] Field of Search ........................ 250/239, 208.1, 250/216; 358/471, 482, 483, 487, 496, 498; 257/433, 789, 793, 794, 795

[56] References Cited

U.S. PATENT DOCUMENTS

| | | | |
|---|---|---|---|
| 4,808,812 | 2/1989 | Tanaka et al. | 250/216 |
| 5,399,850 | 3/1995 | Nagatani et al. | 250/208.1 |
| 5,434,681 | 7/1995 | Imamura et al. | 358/471 |
| 5,581,076 | 12/1996 | Tabata | 250/239 |

*Primary Examiner*—Edward P. Westin
*Assistant Examiner*—Kevin Pyo
*Attorney, Agent, or Firm*—Fitzpatrick, Cella, Harper & Scinto

[57] ABSTRACT

A sensor unit has a sensor for executing a photoelectric conversion, a rod lens for transferring light to the sensor, and a frame for accommodating the sensor and rod lens. A reinforcing member is formed in close proximity to a rod lens accommodating portion of the frame. The frame is preferably constructed of an opaque material and the reinforcing member is preferably constructed of a transparent material.

12 Claims, 5 Drawing Sheets

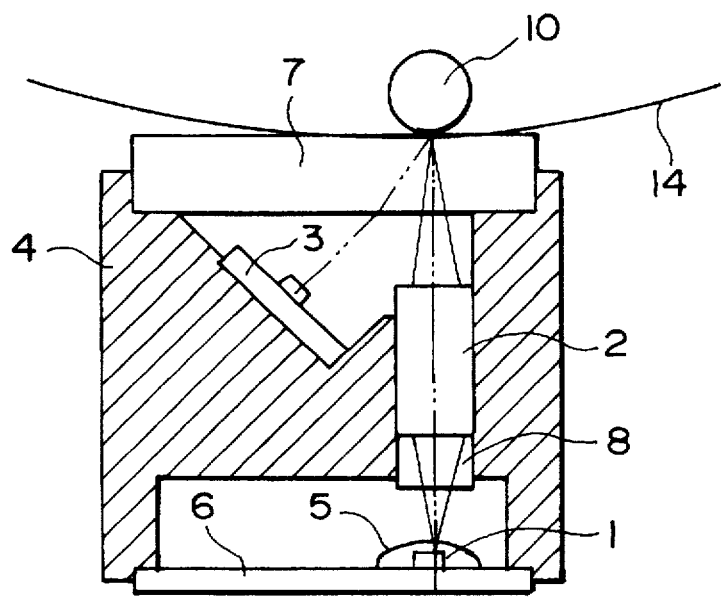
F I G. 5
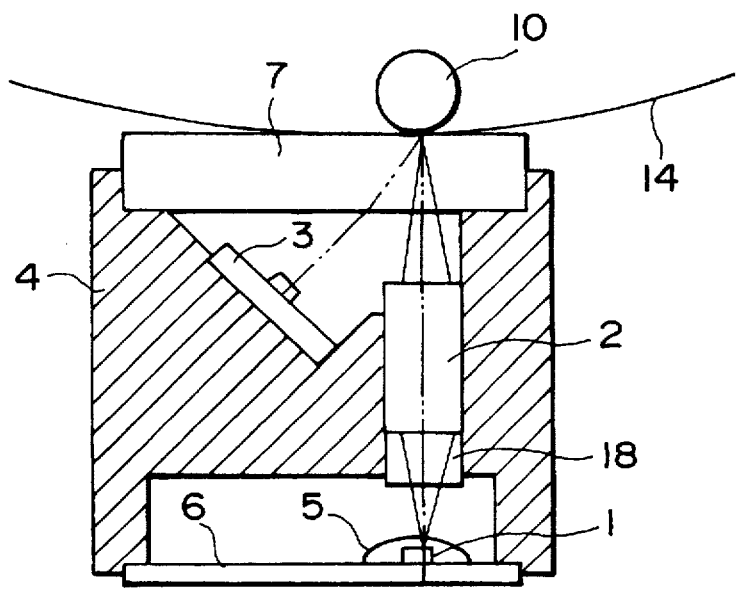
F I G. 6

IMAGE READING APPARATUS HAVING OPTICAL REINFORCING MEMBER FOR LENS HOLDER

This application is a continuation of application Ser. No. 08/635,195 filed Apr. 19, 1996, which is now abandoned.

BACKGROUND OF THE INVENTION

1. Field of the Invention

The invention relates to a sensor unit to read out an image on an original which can be used for a facsimile, a copying apparatus, a scanners and the like and to an image reading apparatus using the sensor unit.

2. Related Background Art

Hitherto, as an image reading apparatus which is used for a facsimile, a copying apparatus, a scanner, and the like, there is known a contact type image sensor for reading an image by forming the image onto the sensor in a one-to-one correspondence manner. FIGS. 1 to 3 show an example of a sensor unit of such a contact type image sensor. FIG. 1 is an external view, FIG. 2 is a cross sectional view, and FIG. 3 is a drawing showing an arrangement of an internal sensor array.

As shown in FIG. 2, light is irradiated onto an original surface which is in contact with a transparent glass plate 7 from an LED installed on an LED board 3 provided in a frame 4. Reflected light is formed as an image on a sensor array 1 provided on a board 6 by a rod lens array 2. An original 14 is pressed onto the glass plate 7 by a roller 10.

The sensor array 1 is constructed by arranging a plurality of line sensors 1-1, 1-2, . . . , and 1-15 on the board 6 in a line and is covered with a protecting film 5 as shown in FIG. 3. In the contact type image sensor, since the reflected light from the original is formed as an image on the sensor array at an equal magnification and the image is read in principle, as a length of sensor array 1, only a width of original to be read is necessary. For example, in the care of reading an original of the A3 size, assuming that a length of one line sensor is equal to 20 mm, it is sufficient to construct the sensor array using 15 line sensors.

The board 6 is connected to a flexible board 12 through a flexible wiring 16. A connector 11 for inputting and outputting a power source, control signal, and the like is provided on the flexible board 12 and is attached to the frame 4 by a screw 13.

The frame 4 itself has sufficient strength. However, the strength of the rod lens array 2 is not so great. Therefore, since the lens array 2 cannot be strongly pressed by the frame 4, a cavity is formed in a portion of the frame 4 into which the rod lens array 2 is inserted in order to assure an optical path and a width of such a portion is slightly wider than a width of lens array 2. The lens array 2 is fixed to the frame 4 by, for example, an adhesive agent or the like.

Since the strength of the lens array attaching portion is reduced by such a cavity, the frame 4 has a structure such that it is reinforced by a combination of a metal member or metal and a resin molding member. Therefore, in the conventional image reading apparatus, an increase in size of a whole apparatus and a complication and a large weight cannot be avoided. Further, it is also disadvantageous in terms of an increase in cost due to an increase the number of parts and the amount of assembling work necessary.

SUMMARY OF THE INVENTION

It is an object of the invention to provide a sensor unit having sufficient strength.

Another object of the invention is to provide an image reading apparatus using a sensor unit having sufficient strength.

To accomplish the above objects, according to an embodiment of the invention, there is provided a sensor unit comprising: a sensor for executing a photoelectric conversion; a lens for transferring light to the sensor; a frame for holding the sensor and the lens; and a reinforcing member for reinforcing a lens holding unit of the holding member. By constructing as mentioned above, a sensor unit having sufficient strength can be provided without increase in weight.

According to another embodiment of the invention, there is provided an image signal processing apparatus comprising: a sensor unit having a sensor for executing a photoelectric conversion, a lens for transferring light to the sensor, a frame for holding the sensor and the lens, a reinforcing member for reinforcing the lens holding portion of the holding member; and a signal processing circuit for processing a signal which is generated from the sensor. By constructing as mentioned above, an image reading apparatus having sufficient strength can be provided without increasing the size and weight of the apparatus.

The above and other objects and features of the present invention will become apparent from the following detailed description and the appended claims with reference to the accompanying drawings.

BRIEF DESCRIPTION OF THE DRAWINGS

FIG. 5 is a cross sectional view of a sensor unit according to the first embodiment;

FIG. 6 is a cross sectional view of a sensor unit according to the second embodiment;

DETAILED DESCRIPTION OF THE PREFERRED EMBODIMENTS

Figure 1:
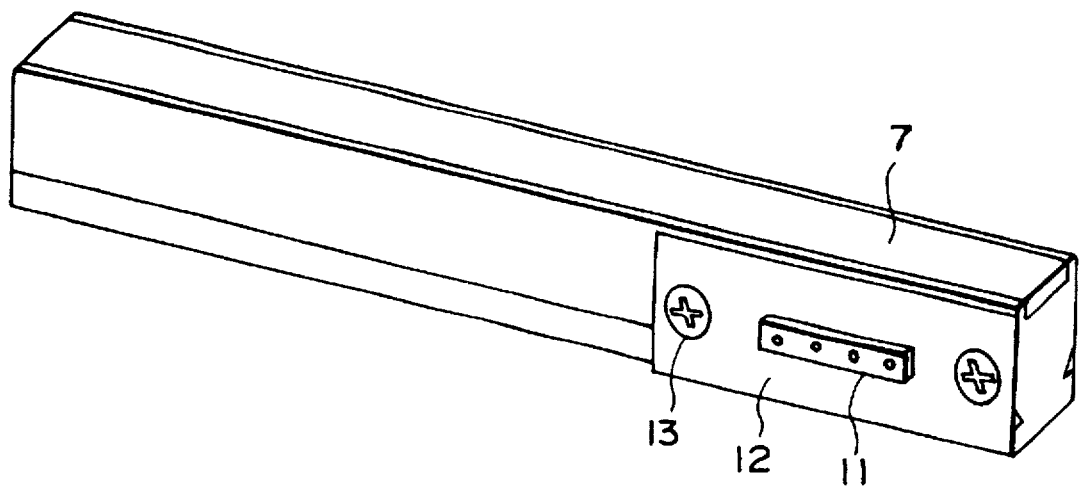
FIG. 1 is an external perspective view of a conventional sensor unit.
Figure 2:
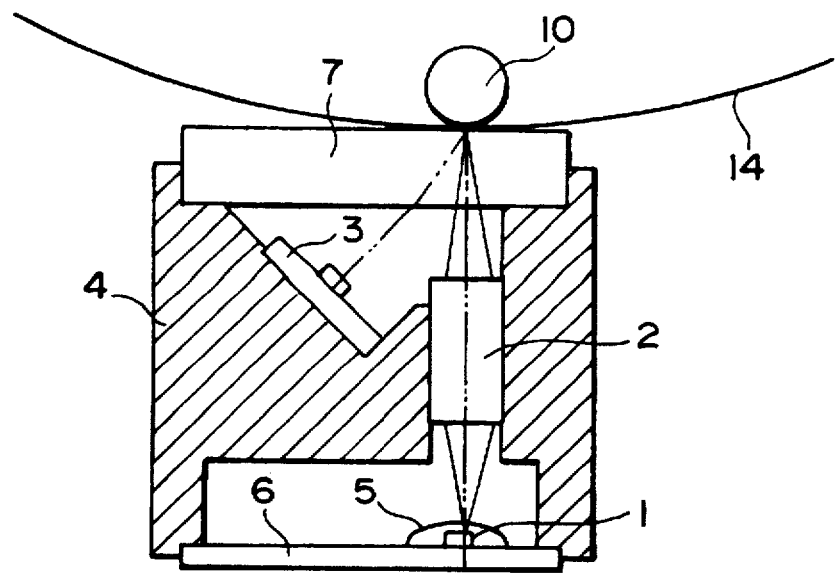
FIG. 2 is a cross sectional view of a conventional sensor unit.
Figure 3:
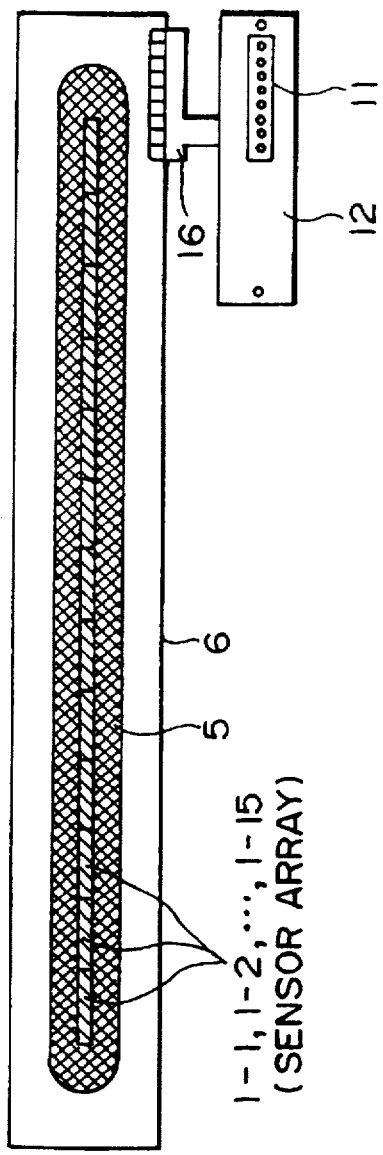
FIG. 3 is a diagram showing an arrangement of sensors on a sensor board.
Figure 4:
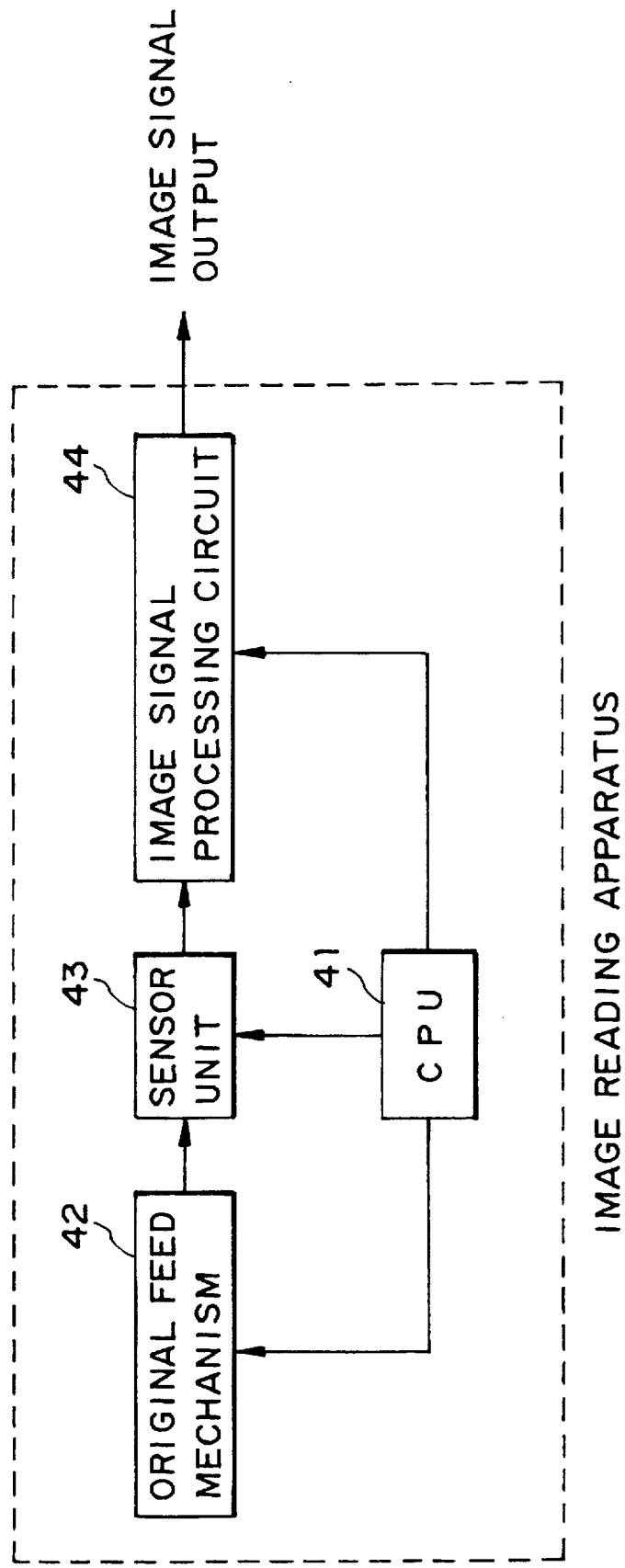
FIG. 4 is a constructional block diagram of an image reading apparatus.

FIG. 4 is a constructional block diagram showing a construction of a whole image reading apparatus according to the first embodiment of the present invention. In FIG. 4, the whole apparatus is controlled by a CPU 41 and an original to be read is fed by an original feed mechanism 42. An image on the original which was fed is read by a sensor unit 43. A signal generated therefrom is subjected to predetermined processes by an image signal processing circuit 44 and the processed signal is outputted.

FIG. 5 is a diagram for explaining the detailed construction of the sensor unit 43 according to the first embodiment. In FIG. 5, a plurality of sensor chips 1 for executing photoelectric conversion are installed on the sensor board 6 in a line such that the sensor chips 1 are protected by the protecting film 5. The rod lens array 2 for forming an image of reflected light from the original onto the sensor 1 on the sensor board 6, the light source 3 comprising an LED for illuminating the original, and the cover glass 7 with which the original comes into contact are mounted to the frame 4.

In the contact type image sensor with the above construction, an opaque member to shut off a light from the outside, (for example, an opaque synthetic resin member) is used as a frame 4 for holding the sensor board 6, light source 3, and rod lens array 2. A transparent reinforcing member 8 is provided for an optical path portion corresponding to at least the image forming portion of the rod lens array 2. The reinforcing member 8 is coupled to the frame 4 made of the opaque member, thereby reinforcing the frame 4 of the arranging portion of the rod lens array 2. The width of reinforcing member 8 is slightly wider than the width of lens array 2. The lens array 2 is fixed to the frame 4 by an adhesive agent or the like.

As mentioned above, the frame 4 to hold the rod lens array 2 for (which is for forming an image of the light onto the sensor, light source 3, sensor board 6, and the like) is formed by the opaque member. The transparent reinforcing member 8 is arranged in the optical path portion corresponding to the image forming portion of the light on the emitting side of the rod lens array 2. Therefore, a cavity portion of the frame 4 by the arrangement of the rod lens array 2 can be directly reinforced and an increase in size and weight of the apparatus can be prevented.

In the embodiment, although the transparent reinforcing member has been provided under the lens, even when it is provided on the lens, a similar effect can be also obtained.

FIG. 6 is a constructional cross sectional view showing the second embodiment of the sensor unit 43. In FIG. 6, a resin molding member of two colors is used to hold the rod lens array 2 for the frame 4. That is, a transparent resin molding member 18 is used for the optical path corresponding to the image forming portion of the light under the lens array. Opaque resin molding members to shut off the light from the outside are used for the frame 4 to hold the side of the rod lens array 2, light source 3, sensor board 6, and the like.

Both of the molding members are simultaneously molded and molding members made of the same type of material are preferably used. According to the embodiment, the transparent resin molding member 18 is inserted into a mold, is simultaneously molded upon molding of the frame 4, and is connected with the frame.

By constructing the sensor unit as mentioned above, the cavity portion of the frame 4 which was caused by the arrangement of the rod lens array (for forming an image of the reflected light from the original) is reinforced by the transparent resin molding member 18, so that sufficient strength can be given to the frame 4.

Figure 7:
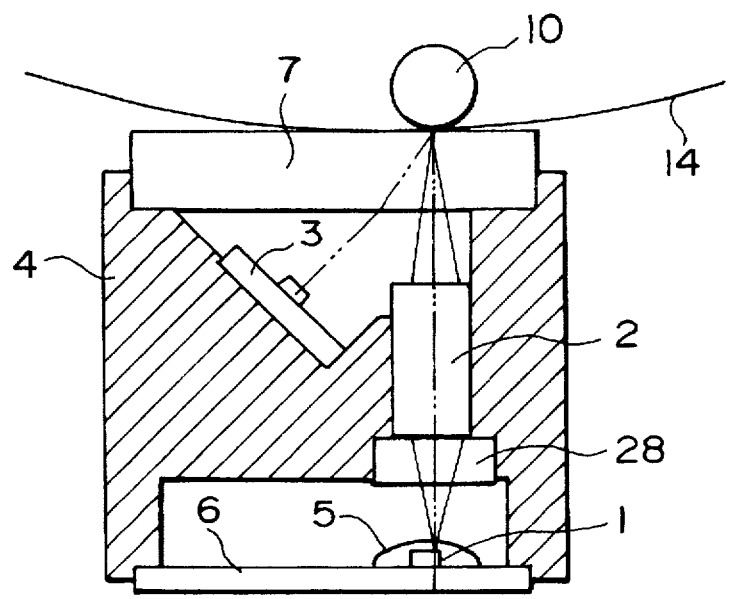
FIG. 7 is a cross sectional view of a sensor unit according to the third embodiment.

FIG. 7 is a constructional cross sectional view showing the third embodiment of the sensor unit 43. In FIG. 7, a glass member and a resin molding member are used to hold the rod lens array 2. That is, a transparent glass member 28 is used in the optical path portion corresponding to the image forming portion of the light under the rod lens array 2. An opaque resin molding member to shut off the light from the outside Is used in the other portion of the frame 4. According to the embodiment, they are simultaneously molded by an inserting method.

By constructing the sensor as mentioned above, the cavity portion of the frame 4 by the arrangement of the rod lens array 2 to form an image of the reflected light from the original is reinforced by the transparent glass member 28, so that sufficient strength can be given to the frame 4.

Figure 8:
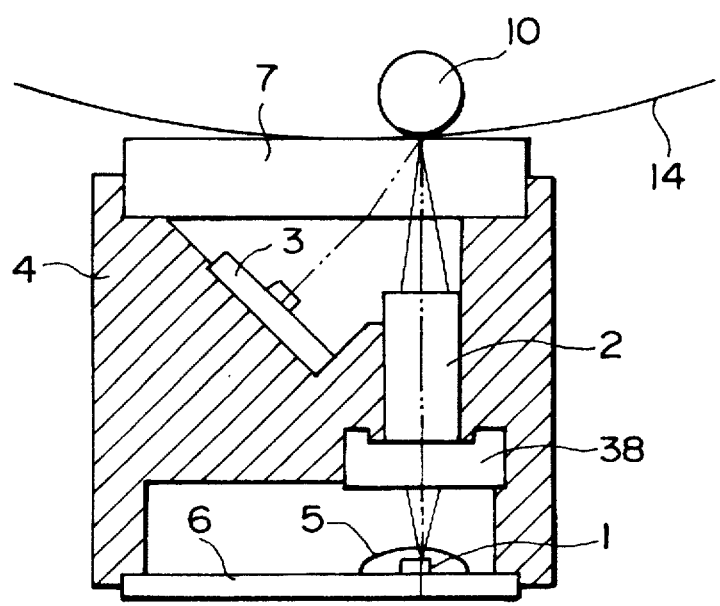
FIG. 8 is a cross sectional view of a sensor unit according to the fourth embodiment.

FIG. 8 is a constructional cross sectional view showing the fourth embodiment of the sensor unit 43. In FIG. 8, the glass member and the resin molding member are used to hold the rod lens array in a manner similar to the third embodiment. According to the embodiment, they are not simultaneously molded but are individually molded and are fitted with each other upon assembling, thereby fixing the elements in position. The other constructions are similar to those of the above embodiment.

When an image is read, by using the sensor unit, on the original reading surface, the image on the original 14 is read out by conveying the original while it is pressed to the transparent cover glass 7 by the conveying roller 10.

As described above, according to the invention, the contact type image sensor comprises: the sensor board onto which a sensor chip having a plurality of photosensitive elements to execute the photoelectric conversion is installed; the lens array to form an image of the light from the original to the sensor chip; the frame made by the opaque member to hold the sensor board and lens array; and the transparent reinforcing member which is coupled to the opaque member and reinforces the frame of the optical path portion of the lens array. Thus, the cavity portion of the frame that is caused by arrangement of the lens array is reinforced. Therefore, the frame can be reinforced while reducing the number of parts and avoiding an increase in size and weight of the apparatus.

Many widely different embodiment of the present invention may be constructed without departing from the spirit and scope of the present invention. It should be understood that the present invention is not limited to the specific embodiments described in the specification, except as defined in the appended claims.

What is claimed is:

1. A sensor unit comprising:
   (a) a sensor for executing a photoelectric conversion;
   (b) a rod lens array for transferring light to said sensor, said rod lens array having an optical path that extends to said sensor;
   (c) a frame for accommodating said sensor and said rod lens array, said frame having a rod lens array accommodating portion; and
   (d) a transparent reinforcing member, located on the optical path between said rod lens array and said sensor, for reinforcing said rod lens array accommodating portion.

2. A unit according to claim 1, wherein said frame is constructed by an opaque member.

3. A unit according to claim 2, wherein said frame and said reinforcing member are made of the same kind of material.

4. A unit according to claim 3, wherein said frame and said reinforcing member are each made of resin.

5. A unit according to claim 2, wherein said frame is made of a resin material and said reinforcing member is made of a glass material.

6. A unit according to claim 1, wherein said frame and said reinforcing member are fixed by fitting with each other.

7. An image signal processing apparatus comprising:
   (a) a sensor unit having a sensor for executing a photoelectric conversion, a rod lens array for transferring light to said sensor, said rod lens array having an optical path that extends to said sensor, a frame for accommodating said sensor and said rod lens array and having a rod lens array accommodating portion, and a transparent reinforcing member, located on the optical path between said rod lens array and said sensor, for reinforcing said rod lens array accommodating portion; and (b) a signal processing circuit for processing a signal which is generated from said sensor.

8. An apparatus according to claim 7, wherein said frame is constructed by an opaque member.

9. An apparatus according to claim 8, wherein said frame and said reinforcing member are made of the same kind of material.

10. An apparatus according to claim 9, wherein said frame and said reinforcing member are each made of resin.

11. An apparatus according to claim 8, wherein said frame is made of a resin material and said reinforcing member is made of a glass material.

12. An apparatus according to claim 7, wherein said frame and said reinforcing member are fixed by fitting with each other.

\* \* \* \* \*

UNITED STATES PATENT AND TRADEMARK OFFICE
CERTIFICATE OF CORRECTION

PATENT NO. : 5,783,820
DATED : July 21, 1998
INVENTOR(S) : Elichi Takami

It is certified that error appears in the above-identified patent and that said Letters Patent is hereby corrected as shown below:

COLUMN 1

Line 12, "scanners" should read --scanner--.
    Line 37, "care" should read --case--.
    Line 62, "increase" should read --increase in--.

COLUMN 2

Line 11, "without" should read --without an--.

COLUMN 3

Line 6, "outside, (for example," should read --outside, (for example--.
    Line 18, "for" (first occurrence) should be deleted.
    Line 60, "Is" should read --is--.

UNITED STATES PATENT AND TRADEMARK OFFICE
CERTIFICATE OF CORRECTION

PATENT NO. : 5,783,820
DATED : July 21, 1998
INVENTOR(S) : EIICHI TAKAMI

It is certified that error appears in the above-identified patent and that said Letters Patent is hereby corrected as shown below:

COLUMN 4

Line 24, "by" should read --by the--.
    Line 28, "embodiment" should read --embodiments--.

Signed and Sealed this

Twenty-fifth Day of May, 1999

Attest:

Q. TODD DICKINSON

*Attesting Officer*      *Acting Commissioner of Patents and Trademarks*